Patented Sept. 11, 1934

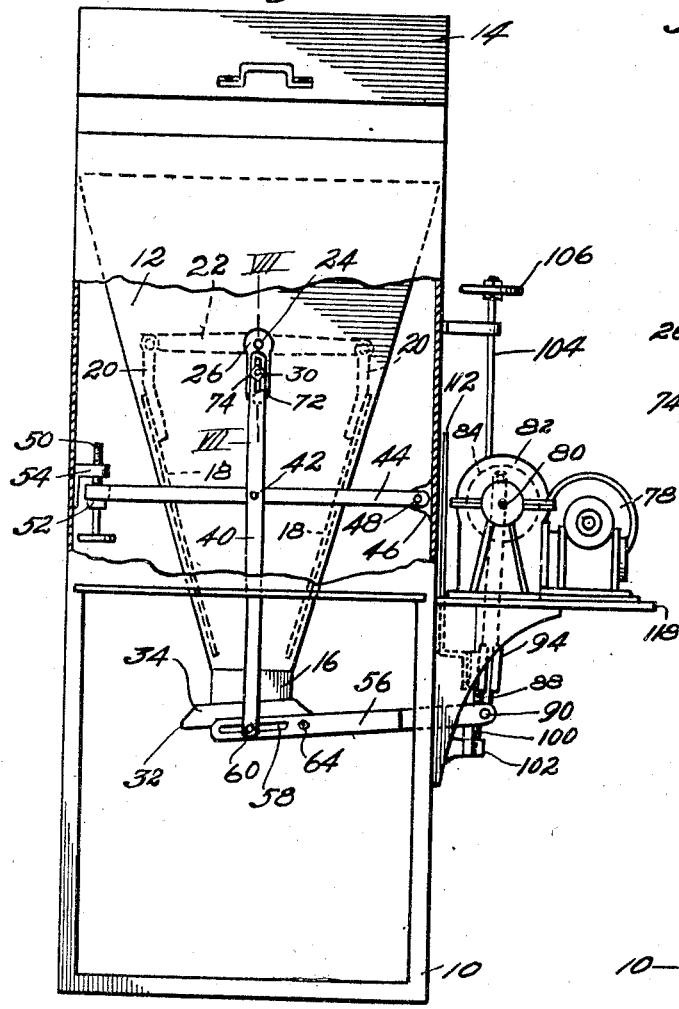

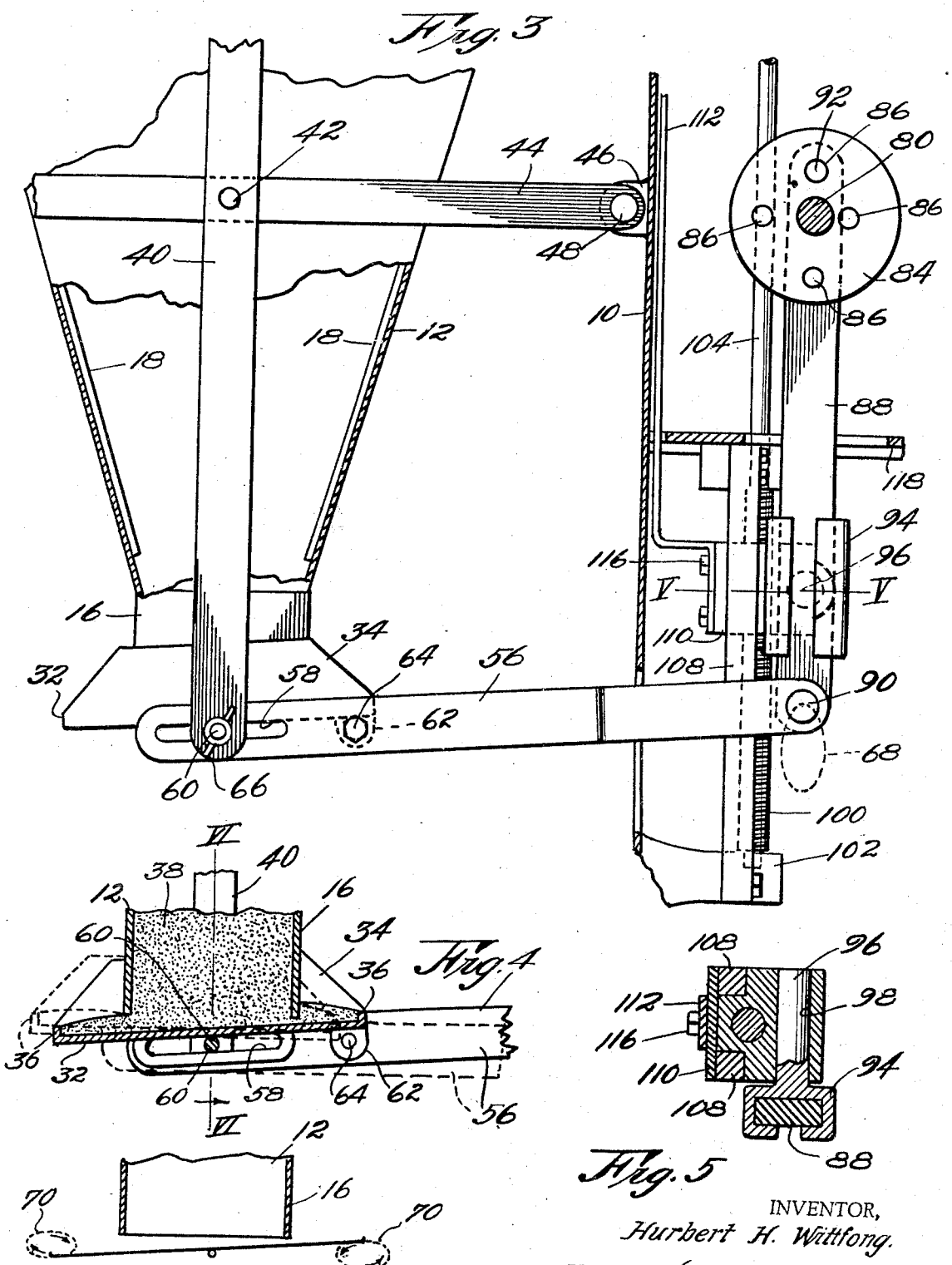

1,973,191

UNITED STATES PATENT OFFICE 1,973,191

DRY MATERIAL MEASURING AND FEEDING APPARATUS

Hubert H. Wiltfong, Kansas City, Mo.

Application July 21, 1932, Serial No. 623,791

8 Claims. (Cl. 221—118)

This invention relates to material handling devices and the primary object is to provide a measuring and feeding apparatus for dry material and particularly chemicals which are to be constantly and periodically fed in predetermined quantities from the apparatus to any receiving means such as a flowing stream of water or the like, disposed adjacent the apparatus.

One of the important objects of the present invention is the contemplation of apparatus for the handling and dispensing of dry chemicals or materials, wherein is incorporated means for feeding a predetermined amount of material, which amount might be varied as the machine is operated and with a minimum amount of adjustment.

A still further object of the invention is to provide a material measuring and feeding apparatus wherein is incorporated a single driving means which actuates suitable agitators within the hopper of the apparatus and likewise imparts swinging and rocking movement to the part of the apparatus which actually measures and feeds the material.

A yet further object of this invention is the provision of a machine of the character mentioned that is exceptionally efficient in its operation, comparatively cheap to manufacture, includes but a minimum number of parts to perform an exceptional number of functions and may be adjusted to suit the requirements of practically any condition where such apparatus is used.

Some of the most important objects of the invention are found in specific structures included in the machine. The above broad objects and many of the more important minor objects will appear during the course of the detailed specification, referring to the accompanying drawings, wherein but one form of the invention has been illustrated and wherein:

Figure 1 is a front elevation of a measuring and feeding apparatus embodying this invention, a part of the housing being broken away for clearness.

Fig. 2 is a side elevation of the machine shown in Fig. 1.

Fig. 3 is an enlarged, fragmentary, detailed view of that portion of machine in proximity to the outlet end of the hopper.

Fig. 4 is a fragmentary, vertical, central section through the lowermost end of the hopper and the tray which receives the material.

Fig. 5 is a detailed cross sectional view through the unique bearing employed in the mechanism, taken on line V—V of Fig. 3.

Fig. 6 is a fragmentary, sectional view taken on line VI—VI of Fig. 4.

Fig. 7 is another fragmentary, detailed view taken on line VII—VII of Fig. 1, and, Fig. 8 is a diagrammatical showing of the lower portion of the hopper, and the path of travel of the tray disposed therebeneath.

In practice it is common to use a material measuring and feeding apparatus of the character illustrated in the drawings to measure and feed a dry chemical of suitable nature to water being treated at waterworks prior to its being forced through the mains for use. In many instances the condition of the water being treated requires a greater or lesser amount of the chemical from day to day and in other instances it is oftentimes necessary to measure and feed two distinct amounts of chemical. The apparatus contemplated by this invention may be used for the purpose just mentioned or for any other purpose remote from the treating of water which may be desired. The concepts of the invention do not require the machine to be used in any particular field. In the drawings, like reference numerals are used to designate similar parts throughout the several views, and the number 10 indicates a combined support and housing for an open-bottom hopper 12, into which may be dumped the dry material to be fed. A covering 14 might be used to close the top of hopper 12 and it is desired that the sides of said hopper 12 be tapered or inclined to converge as the open bottom of the same is approached.

Hopper 12 terminates near its bottom in the form of a short untapered portion formed by wall 16. Thus an effective hopper is created with an open bottom formed by four-sided wall 16, the lower edge of which is continuous and likewise in the same substantially horizontal plane. To insure proper flow of the material from hopper 12, it is desirable to provide agitators which, in this instance, are in the form of plates 18. These plates lie against two of the inclined opposed walls of hopper 12 and are constantly moved by the same drive means that actuates the remaining part of the mechanism as the apparatus is operated. Plates 18 are each supported by bifurcated member 20 which pivotally joins rocker arm 22, carried by shaft 24, journaled in the sides of hopper 12 and extending therebeyond to be affixed to a crank 26 having a slot 28 therein to receive pintle 30 for the purpose hereinafter set down.

A tray 32 is swingably and rockingly supported beneath the open bottom of hopper 12 and is formed to present opposed upstanding sides 34 and an upstanding lip 36 at each end. Reference to Fig. 4 readily teaches that each lip 36 is just high enough to retard the flow of material 38 which passes from hopper 12 on to tray 32 between the sides of wall 16. To swingably support tray 32, there should be provided a pair of opposed links 40, both of which depend from and are pivotally attached as at 42 to U-shaped member 44, which in turn has the ends of its legs pivotally secured to housing 10 through the medium of lugs and pins 46 and 48 respectfully. The base of this U-shaped member is adjustably supported by the wall of housing 10 as illustrated in Fig. 1. Support and adjustment is obtained by using a hand-operated screw 50, shouldered as at 52 to support U-shaped member 44 and to lift it after screw 50 is turned in stationary housing-supported lug 54. Thus with the ends of the legs of U-shaped member 44 pivotally mounted and the base of said member 44 adjustably affixed as just mentioned, it is obvious that the same may be moved vertically to raise and lower links 40 which are pinned as at 42 to this U-shaped member 44.

As shown in Fig. 2, one of links 40 extends upwardly to carry pintle 30 and to engage crank 26 so that when link 40 is actuated, movement at its upper end will be imparted to agitator plates 18 through the medium of crank 26, shaft 24, cross arm 22 and members 20. Tray 32 is supported by links 40 and the swinging motion imparted thereto is always about opposed pins 42 as a center.

It is desirable to impart a rocking motion to tray 32 as swinging action is caused to take place and to accomplish this purpose, a yoke 56 is provided to have a part thereof extend on each side respectively of tray 32. Opposed slots 58 are formed along a part of the length of yoke 56 and a cross bolt 60 extends through the lowermost links 40 and slots 58 of yoke 56. It is about this bolt 60 as a pivotal point that tray 32 is rocked, by the later described movement on the part of yoke 56. Yoke 56 and tray 32 rock together and their rigid relation is further secured by providing lugs 62 which are connected to yoke 56 by bolts 64, as shown in Figs. 1, 3 and 4. Yoke 56 is drawn together to tightly hold tray 32 therebetween when the winged nut 66 is tightened, but to allow free pivotal movement at the point where links 40 engage bolt 60, there is provided a sleeve 68 which is slightly longer than the thickness of links 40 and which receives the pressure imparted by nut 66 and imparts the same to the sides of yoke 56, which lie against the sides of tray 32. Links 40 are thereby left free to pivot with the binding. Obviously, the use of slots 58 and the bolt construction just set down permits relative movement between the lower ends of links 40 and tray 32. Manifestly, the change in position on the part of bolt 60 will move the fulcrum point so that the rocking movement will be varied.

It is plain to be seen that the path of travel, so far as the rocking action is concerned, followed by the opposite lipped ends of tray 32, will vary as bolt 60 is moved along beneath tray 32. It is necessary to move the end of yoke 56 opposite from that end attached to tray 32 through a continuous path of travel such, for instance, as that indicated by dotted line 68 in Fig. 3. Movement of this end of yoke 56 from the uppermost to the lowermost point of the ellipse described by line 68 will impart a rocking movement to tray 32 about bolt 60 as a fulcrum point. Movement of yoke 56 from the extreme right to the extreme left side of the elipse described by line 68 will move tray 32 transversely of the bottom of hopper 12 and about pin 42 as a center. The two actions just set down are performed simultaneously and as a result thereof, the lipped ends of tray 32 travel through a path of travel indicated by dotted lines 70 of Fig. 8. The direction of travel is likewise indicated by arrows in this figure. Such movement causes a shoving-off or feeding of a certain amount of material 38 which is always being constantly fed by gravity to tray 32 from hopper 12 between walls 16.

Reference to Fig. 4 teaches that the right hand wall 16 is ready to force a quantity of material 38 from tray 32 when the same is moved toward the left. This action takes place on each side of the bottom of hopper 12 so long as there is material in the hopper and so long as the actuating means of the apparatus is operating. When material of a coarse nature is to be fed, it is desirable to move tray 32 a greater distance from the lower edges of the wall than is the case when fine material is being measured and fed. The previously described parts, including U-shaped member 44 and its associated adjusting members 50, 52 and 54, allows raising and lowering tray 32 for the purpose specified. Compensation for this movement is allowed through the length of slot 28 formed in crank 26. Pintle 30 moves along slot 28 whenever tray 32 is raised or lowered by a similar movement imparted to U-shaped member 44.

Since it has been indicated that yoke 56 is moved through a path of travel designated by line 68 of Fig. 3, it is plain to see that the movement on the part of link 40 about pin 42 will impart action to agitator plates 18. A swinging movement is given crank 26 and such movement carried into hopper 12 to plates 18 in an obvious manner.

Fig. 7 illustrates one way of varying the throw given to plates 18. A slot 72, formed through link 40, and through which passes pintle 30, allows longitudinal adjustment thereof upon loosening nut 74 which is provided to hold link 40 against shoulder 76, formed on pintle 30.

Power to drive the parts of this measuring and feeding apparatus might be obtained through the use of a motor 78, which in turn drives shaft 80 through a speed reducer 82. Drive disk 84, keyed or otherwise rigidly secured to shaft 80, is provided with a plurality of holes 86 therethrough, said holes being various distances from the center of said disk, whereby to vary the movement imparted to arm 88, one end of which is secured to drive disk 84, while the other end thereof is pivotally affixed to yoke 56 by a pin or other member 90. The pin 92 connecting arm 88 to drive disk 84 may be imparted into any one of holes 86 for the purpose of varying the swinging and rocking movement of tray 32. To cause the lower end of arm 88 to follow a continuous path of travel such as that described by line 68, it is necessary to use a unique mounting for the arm to allow longitudinal sliding movement thereof as a pivotal movement takes place. The bearing illustrated in Fig. 5 may be used for this purpose. Arm 88 is slidably engaged by guide 94 and guide 94 is, in turn, provided with a stub shaft 96, about which guide and arm pivots as a center.

Stub shaft 96 is journaled in a bearing 98 that might be raised and lowered by screw 100, which passes therethrough. Screw 100 is mounted in bearing 102 at its lower end and extends upwardly in the form of stem 104 which is equipped with a hand wheel 106, whereby to turn both stem and screw 104 and 100 when bearing 98 is to be raised or lowered.

A slide, consisting of tracks 108, carries bearing 98 and a plate 110 slidably attaches bearing 98 to said tracks for movement therealong. The turning of hand wheel 106 raises or lowers bearing 98 and all that is associated therewith. An indicator 112 extends upwardly from bearing 98 to a point easily visible by the operator and terminates very close to the side of housing 10, upon which is marked graduations 114 for the purpose of designating the amount of movement which has been imparted to bearing 98. Indicator 112 is securely affixed to bearing 98 by bolts or similar means 116 and obviously moves therewith. A shelf 118 supports motor 78 and speed reducer 82, thus making the entire apparatus unitary in form.

Any adjustment to cause the apparatus to measure and feed any quantity of material is obtainable through the parts just described. The length of the vertical path of travel on the part of the outer end of yoke 56 might be altered by moving the upper end of arm 88 to holes 86 which are varying distances from the center of shaft 80. This adjustment likewise changes the maximum horizontal throw of the outer end of yoke 56, but this throw might again be altered by moving pintle 96, carried by bearing 98. Thus a greater or lesser swinging movement from side to side about pin 42 might be obtained for tray 32 and a greater or lesser rocking movement about bolt 60 as a fulcrum point might be imparted to tray 32. The relation between adjustments is practically unlimited and this apparatus may be used where exceptionally minute alteration in the quantity of material fed from time to time is necessary.

The necessity for a machine embodying principles such as described herein is well known in the art and while specific structure has been described and illustrated to render clear the concepts of this invention, it is understood that any modifications which might fairly fall within the intent of the invention and scope of the appended claims might be practiced without departing from their terms.

Having thus described the invention, what is claimed as new and desired to be secured by Letters Patent is:

1. In a material measuring and feeding apparatus, an open botton hopper; a tray disposed beneath the open bottom of said hopper; agitator plates within the hopper; and a link pivotally carried intermediate its ends, said tray being supported by the link at one end and said agitators being connected to the said link at its opposite end whereby movement thereof about its pivotal connection will actuate both tray and agitator.

2. In a material measuring and feeding apparatus, a hopper; an agitator within the hopper; a tray swingably supported to receive material from said hopper; a link interconnecting said agitator and tray; drive means to actuate said link; and means to vary the connection between said link and tray whereby to change the movement of the tray as the link action remains constant.

3. In a material measuring and feeding apparatus, a hopper; an agitator within the hopper; a tray swingably supported beneath said hopper to receive material therefrom; and structure for swinging said tray including an arm, a pivotally supported guide slidably carrying said arm and means for simultaneously oscillating said arm about said pivotal support as the arm is slid along said guide.

4. In a material measuring and feeding apparatus, an open-bottom hopper; a tray swingably and rockably supported beneath said hopper to receive material therefrom; and means to impart such movement to the tray including a yoke attached thereto; and means to carry one end of said yoke through an endless elliptical path of travel whereby to move the same vertically and horizontally.

5. In a material measuring and feeding apparatus; a hopper; a tray swingably supported beneath said hopper to receive material therefrom; a vertically adjustable member above said tray; a link pivotally carried by said member; a yoke attached to said tray and the depending end of said link; and driving means to carry one end of said yoke through an endless path of travel whereby to move the same vertically and horizontally.

6. In a material measuring and feeding apparatus, an open-bottom hopper; a tray swingably and rockably supported beneath said hopper to receive material therefrom; means to impart such movement to the tray including a yoke attached thereto; means to carry one end of said yoke through an endless elliptical path of travel whereby to move the same vertically and horizontally; and structure to vary the length of vertical and horizontal travel.

7. In a material measuring and feeding apparatus, an open-bottom hopper; a tray swingably and rockably supported beneath said hopper to receive material therefrom; and means to impart movement to the tray including a yoke attached thereto; means to carry one end of said yoke through an endless path of travel whereby to move the same vertically and horizontally; and structure to vary the length of vertical and horizontal travel, said structure being manually adjustable to produce the variation as the yoke is carried through the said endless path of travel.

8. In a material measuring and feeding apparatus, an open-bottom hopper; a tray swingably and rockably supported to receive material from the hopper; drive means to swing and rock the said tray; and structure interposed between the drive means and tray to vary the degree of swing and rock, including a rotatable drive disk having a plurality of holes therethrough, said holes being various distances from the center of said disk, an arm movable by said disk, and a support for said arm adapted to permit simultaneous rocking and sliding movement thereof as the same is moved by said disk said support having means to maintain its arm-engaging member at any predetermined point along the length thereof adjacent its one end.

HUBERT H. WILTFONG.